(12) United States Patent
Liu et al.

(10) Patent No.: US 8,964,792 B2
(45) Date of Patent: Feb. 24, 2015

(54) METHOD AND SYSTEM FOR CONTROLLING COMPRESSED MODE IN MACRO-DIVERSITY STATE

(75) Inventors: Lin Liu, Shenzhen (CN); Xiang Cheng, Shenzhen (CN); Yazhu Ke, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 80 days.

(21) Appl. No.: 13/808,192

(22) PCT Filed: May 12, 2011

(86) PCT No.: PCT/CN2011/074000
§ 371 (c)(1),
(2), (4) Date: Jan. 3, 2013

(87) PCT Pub. No.: WO2012/010003
PCT Pub. Date: Jan. 26, 2012

(65) Prior Publication Data
US 2013/0107815 A1 May 2, 2013

(30) Foreign Application Priority Data
Jul. 20, 2010 (CN) .......................... 2010 1 0233947

(51) Int. Cl.
*H04J 3/06* (2006.01)
*H04W 48/18* (2009.01)
(Continued)

(52) U.S. Cl.
CPC .............. *H04W 48/18* (2013.01); *H04W 28/06* (2013.01); *H04L 69/04* (2013.01)
USPC ............................ 370/504; 370/503; 370/507

(58) Field of Classification Search
None
See application file for complete search history.

(56) References Cited

U.S. PATENT DOCUMENTS

| 5,883,899 A * | 3/1999 | Dahlman et al. .............. 370/468 |
| 6,456,847 B1 * | 9/2002 | Lilja et al. ..................... 455/437 |
| 7,643,837 B2 * | 1/2010 | de Vries ....................... 455/502 |

(Continued)

FOREIGN PATENT DOCUMENTS

| CN | 1426172 A | 1/2003 |
| CN | 1725669 A | 1/2006 |

OTHER PUBLICATIONS

International Search Report (Form PCT/ISA/210) for PCT/CN2011/074000, mailed Aug. 18, 2011.
(Continued)

*Primary Examiner* — Robert Wilson
(74) *Attorney, Agent, or Firm* — Koppel, Patrick, Heybl & Philpott (57) ABSTRACT

A method and a system for controlling a compressed mode in a macro-diversity state are provided by the disclosure, wherein the method comprises that a terminal and a serving node B determine a compressed mode, wherein the compressed mode comprises: transmission gap pattern sequence information; the terminal and the serving node B start or stop the compressed mode, the terminal or the serving node B indicates a current compressed mode state to a related node B, and the related node B performs compressed mode operation according to the current compressed mode state. According to the disclosure, the problem that the execution state of the compressed mode of the terminal and a network side cannot be synchronized is solved, normal operation of the compressed mode of the terminal is guaranteed, and the service quality of the terminal and the performance of the system are improved.

19 Claims, 5 Drawing Sheets

(51) Int. Cl.
*H04W 28/06* (2009.01)
*H04L 29/06* (2006.01)

(56) References Cited

U.S. PATENT DOCUMENTS

2009/0227248 A1* 9/2009 Chance et al. ............... 455/423

2013/0107815 A1* 5/2013 Liu et al. ...................... 370/328

OTHER PUBLICATIONS

US Publication No. 2005128978A1 to Andersen, et al., dated Jun. 16, 2005.

* cited by examiner

METHOD AND SYSTEM FOR CONTROLLING COMPRESSED MODE IN MACRO-DIVERSITY STATE

FIELD OF THE INVENTION

The disclosure relates to the field of communications, and more particularly, to a method and a system for controlling a compressed mode in a macro-diversity state.

BACKGROUND OF THE INVENTION

With constant evolution of communication wireless network technologies from 2G Global Systems for Mobile Communications (GSM) to 3G Wideband Code Division Multiple Access (WCDMA) systems, and to 3G Long Term Evolution (LTE) systems, network deployment of operators also needs to meet user requirements necessarily, and systems of multiple standards may coexist. Currently, wireless network functions of the operators are defined generally as follows: the 2G GSM systems are mainly configured to carry voices, the 3G WCDMA systems are mainly configured to carry packet domain services, session services and video services, and the 3G LTE systems focus on carrying ultra high speed packet services.

Therefore, inter-system mobility of the 2G GSM system and the 3G WCDMA system is of great importance according to the current network deployment. In addition, mobility management of the 3G LTE systems, e.g. switching to hotspot regions of the LTE systems will become important in the near future.

A switching process resulted from the above inter-system mobility management needs to measure a target system and a target carrier frequency during a preliminary switching preparation stage, so as to execute a switching decision accurately.

A compressed mode plays an important role in the inter-carrier frequency measurement and inter-system measurement. When the compressed mode is applied, a terminal is able to measure a non-serving carrier frequency and carrier frequencies of other systems without any need to be configured with double receivers. When a terminal, which is configured with only one receiver, moves from a 3G WCDMA system to an area covered by a 2G GSM system only, the inter-system measurement can only be performed using the compressed mode. Similarly, the compressed mode can be also applied in a case that a terminal enters and exits an area covered by multiple carrier frequencies of a 3G WCDMA system. Under the compressed mode, a terminal can measure another non-serving carrier frequency without losing any data transmitted on a serving carrier frequency.

The compressed mode is defined as a transmission mode. In this way, data transmission will be compressed in the time domain to generate a transmission gap, in which a receiver of a terminal can be tuned to another carrier frequency to perform measurement.

The transmission gap is described and determined by a "transmission gap pattern sequence". Each set of "transmission gap pattern sequence" is uniquely identified by a "transmission gap pattern sequence identifier" and can be applied to only one "transmission gap pattern sequence measurement purpose", i.e. one of the measurement purposes such as "Frequency-Division Duplexing (FDD) measurement"/"Time-Division Duplexing (TDD) measurement"/"GSM carrier frequency Received Signal Strength Indication (RSSI) measurement"/"initial identification of GSM Base Station Identity Code (BSIC)"/"reconfirmation of GSM Base Station Identity Code (BSIC) identification"/"multi-carrier frequency measurement" and "Evolved Universal Terrestrial Radio Access (E-UTRA) measurement" etc.

Figure 1:
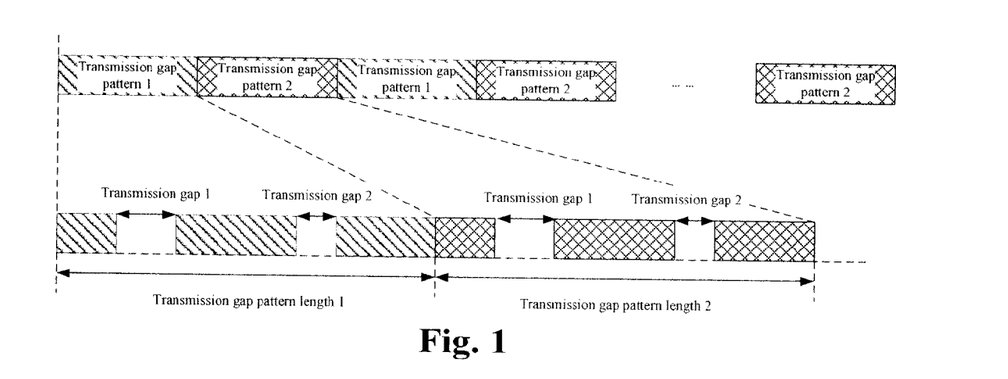
FIG. 1 is a schematic diagram illustrating a transmission gap pattern sequence according to a related technology.

As shown in FIG. 1, each set of "transmission gap pattern sequence" comprises two kinds of alternate "transmission gap patterns", i.e. "transmission gap pattern 1" and "transmission gap pattern 2". Each kind of transmission gap pattern provides one or two transmission gaps within one "transmission gap pattern length". In addition, each set of "transmission gap pattern sequence" also comprises a transmission gap Connection Frame Number (CFN) indicating the start/stop time of the compressed mode, and repetition times of the transmission gap pattern, etc. These parameters are all determined according to the "transmission gap pattern sequence measurement purpose".

Considering accelerating the switching process and improving switching reliability, especially in the area where the radio signal quality is deteriorating rapidly, the inter-carrier and inter-system measurement needs to be completed quickly. In other words, the later the compressed mode is started, the better it is; and the shorter the duration time of the compressed mode is, the better it is, so as to improve system capability and user throughput. Therefore, it is considered that the compressed mode between a terminal and a node B is controlled by the terminal. The terminal judges that the radio signal quality of a current serving cell is bad, and inter-carrier frequency and inter-system measurement may need to be performed to make preparation for switching to an adjacent cell among carrier frequencies/systems, then the terminal starts the compressed mode and notifies the node B.

Figure 2:
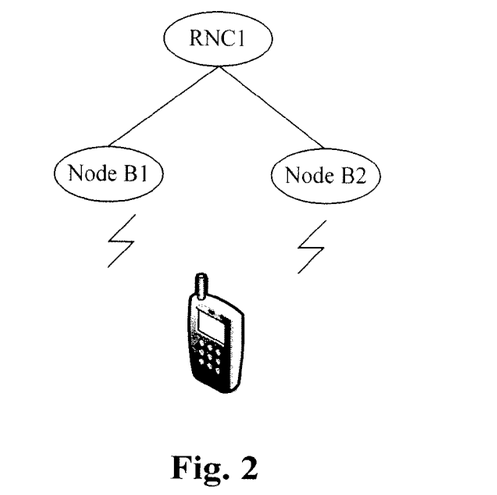
FIG. 2 is a schematic diagram illustrating a networking structure according to a related technology.
Figure 3:
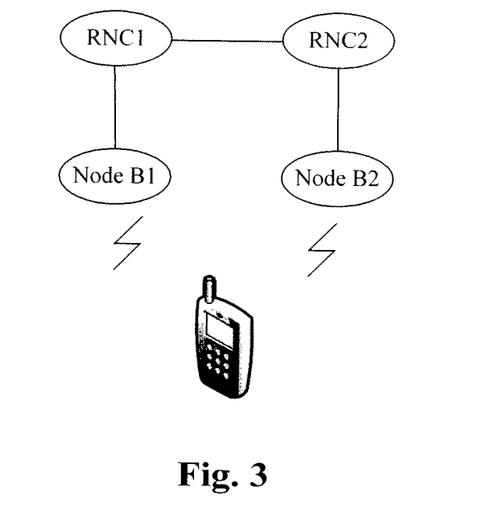
FIG. 3 is a schematic diagram illustrating another networking structure according to a related technology.

A compressed mode can be controlled by a terminal or/a base station (node B) to be started/stopped rapidly within a short period of time. However, problems may exist if the terminal is in a macro-diversity state (i.e. radio links exist between the terminal and two or more Universal Terrestrial Radio Access Network (UTRAN) access points at the same time). In the schematic diagrams illustrating networking structures as shown in FIG. 2 and FIG. 3, a radio link is established between the terminal and node B1 (NodeB1) under RNC1, and between the terminal and node B2 (NodeB2) under RNC1 at the same time in the scenario of FIG. 2; a radio link is established between the terminal and NodeB1 under RNC1, and between the terminal and NodeB2 under RNC2 at the same time in the scenario of FIG. 3. In such cases, starting/stopping a compressed mode is controlled by the terminal or NodeB1 while NodeB2 fails to learn the execution state of the compressed mode. Therefore, the compressed mode cannot be executed by NodeB2 and the terminal synchronously, and the compressed mode of the terminal cannot be operated normally, thus influencing the service quality of the terminal and the performance of the system.

SUMMARY OF THE INVENTION

The disclosure provides a method and a system for controlling a compressed mode in a macro-diversity state, so as to solve the above problem that the execution state of the compressed mode of a terminal and a network side cannot be synchronized.

According to an aspect of the disclosure, a method for controlling a compressed mode in a macro-diversity state is provided, comprising: a terminal and a serving node B determining a compressed mode, wherein the compressed mode comprises: transmission gap pattern sequence information; the terminal and the serving node B starting or stopping the compressed mode, the terminal or the serving node B indicating a current compressed mode state to a related node B, wherein the related node B and the terminal are coupled by an established radio link; and the related node B performing compressed mode operation according to the current compressed mode state.

In the above, the step of the terminal and the serving node B determining the compressed mode comprises one of the followings: the terminal, the serving node B, and a Radio Network Controller (RNC) predetermining the compressed mode; the RNC configuring the compressed mode for the terminal and the serving node B.

In the above, the step of the serving node B indicating the current compressed mode state to the related node B comprises: the serving node B notifying the current compressed mode state to an RNC, and the RNC indicating the current compressed mode state to the related node B.

In the above, the compressed mode is started and the current compressed mode state comprises: indication information identifying that the compressed mode has been started and the transmission gap pattern sequence information; the step of the related node B performing the compressed mode operation according to the current compressed mode state comprises: the related node B starting the compressed mode according to the transmission gap pattern sequence information.

In the above, the compressed mode further comprises: start time of the compressed mode and/or repetition times of a transmission gap pattern of a transmission gap pattern sequence.

In the above, the compressed mode is stopped and the current compressed mode state comprises: indication information identifying that the compressed mode has been stopped; the step of the related node B performing the compressed mode operation according to the current compressed mode state comprises: the related node B stopping a corresponding compressed mode according to the indication information identifying that the compressed mode has been stopped.

According to another aspect of the disclosure, a system for controlling a compressed mode in a macro-diversity state is provided, comprising: a terminal, a serving node B, and a related node B; wherein the terminal is coupled with the serving node B and the related node B via a radio link respectively; the terminal is configured to determine a compressed mode with the serving node B, and after the compressed mode is started or stopped, indicate a current compressed mode state to the related node B, wherein the compressed mode comprises: transmission gap pattern sequence information; the serving node B is configured to determine the compressed mode with the terminal; and the related node B is configured to perform compressed mode operation according to the current compressed mode state.

In the above, the terminal comprises: a starting module, configured to start the compressed mode with the serving node B; a first notification module, configured to indicate the current compressed mode state to the related node B, wherein the current compressed mode state comprises: indication information identifying that the compressed mode has been started and the transmission gap pattern sequence information; the related node B comprises: a first compressed mode synchronization module, configured to start the compressed mode according to the transmission gap pattern sequence information.

In the above, the terminal comprises: a stopping module, configured to stop the compressed mode; a second notification module, configured to indicate the current compressed mode state to the related node B, wherein the current compressed mode state comprises: indication information identifying that the compressed mode has been stopped; the related node B comprises: a second compressed mode synchronization module, configured to stop a corresponding compressed mode according to the indication information identifying that the compressed mode has been stopped.

According to still another aspect of the disclosure, a system for controlling a compressed mode in a macro-diversity state is provided, comprising: a terminal, a serving node B and a related node B; wherein the terminal is coupled with the serving node B and the related node B via a radio link respectively, wherein the terminal is configured to determine a compressed mode with the serving node B, and start or stop the compressed mode, wherein the compressed mode comprises: transmission gap pattern sequence information; the serving node B is configured to determine the compressed mode with the terminal, and after the compressed mode is started or stopped, indicate a current compressed mode state to the related node B; and the related node B is configured to perform compressed mode operation according to the current compressed mode state.

In the above, the system further comprises an RNC, wherein the serving node B comprises: a state indication module, configured to notify the current compressed mode state to the RNC; the RNC is configured to indicate the current compressed mode state to the related node B.

In the above, the serving node B comprises: a starting module, configured to start the compressed mode with the terminal; a first notification module, configured to indicate the current compressed mode state to the related node B, wherein the current compressed mode state comprises: indication information identifying that the compressed mode has been started and the transmission gap pattern sequence information; the related node B comprises: a first compressed mode synchronization module, configured to start the compressed mode according to the transmission gap pattern sequence information.

In the above, the serving node B comprises: a stopping module, configured to stop the compressed mode; a second notification module, configured to indicate the current compressed mode state to the related node B, wherein the current compressed mode state comprises: indication information identifying that the compressed mode has been stopped; the related node B comprises: a second compressed mode synchronization module, configured to stop the corresponding compressed mode according to the indication information identifying that the compressed mode has been stopped.

According to still another aspect of disclosure, a method for controlling a compressed mode in a macro-diversity state, comprising: a terminal and a serving node B determining a compressed mode, wherein the compressed mode comprises: transmission gap pattern sequence information; the terminal and the serving node B starting or stopping the compressed mode, the terminal or the serving node B indicating a current compressed mode state to a related node B so that the related node B performs compressed mode operation according to the current compressed mode state, wherein the related node B and the terminal are coupled by an established radio link.

In the above, the step of the terminal and the serving node B determining the compressed mode comprises one of the followings: the terminal, the serving node B, and a Radio Network Controller (RNC) predetermining the compressed mode; the RNC configuring the compressed mode for the terminal and the serving node B.

In the above, the step of the serving node B indicating the current compressed mode state to the related node B comprises: the serving node B notifying the current compressed mode state to an RNC, and the RNC indicating the current compressed mode state to the related node B.

In the above, the compressed mode is started and the current compressed mode state comprises: indication information identifying that the compressed mode has been started and the transmission gap pattern sequence information; the step of the related node B performing the compressed mode operation according to the current compressed mode state comprises: the related node B starting the compressed mode according to the transmission gap pattern sequence information.

In the above, the compressed mode further comprises: start time of the compressed mode and/or repetition times of a transmission gap pattern of a transmission gap pattern sequence.

In the above, the compressed mode is stopped and the current compressed mode state comprises: indication information identifying that the compressed mode has been stopped; the step of the related node B performing the compressed mode operation according to the current compressed mode state comprises: the related node B stopping a corresponding compressed mode according to the indication information identifying that the compressed mode has been stopped.

According to still another aspect of disclosure, a terminal is provided, the terminal is configured to determine a compressed mode with a serving node B, and after the compressed mode is started or stopped, indicate a current compressed mode state to a related node B, wherein the compressed mode comprises: transmission gap pattern sequence information.

In the above, the terminal comprises: a starting module, configured to start the compressed mode with the serving node B; and a first notification module, configured to indicate the current compressed mode state to the related node B, wherein the current compressed mode state comprises: indication information identifying that the compressed mode has been started and the transmission gap pattern sequence information.

In the above, the terminal comprises: a stopping module, configured to stop the compressed mode; and a second notification module, configured to indicate the current compressed mode state to the related node B, wherein the current compressed mode state comprises: indication information identifying that the compressed mode has been stopped.

According to still another aspect of disclosure, a serving node B is provided, the serving node B is configured to determine the compressed mode with a terminal, and after the compressed mode is started or stopped, indicate a current compressed mode state to a related node B, wherein the compressed mode comprises: transmission gap pattern sequence information.

In the above, the serving node B comprises: a state indication module, configured to notify the current compressed mode state to an RNC which is configured to indicate the current compressed mode state to the related node B.

In the above, the serving node B comprises: a starting module, configured to start the compressed mode with the terminal; a first notification module, configured to indicate the current compressed mode state to the related node B, wherein the current compressed mode state comprises: indication information identifying that the compressed mode has been started and the transmission gap pattern sequence information.

In the above, the serving node B comprises: a stopping module, configured to stop the compressed mode; a second notification module, configured to indicate the current compressed mode state to the related node B, wherein the current compressed mode state comprises: indication information identifying that the compressed mode has been stopped.

By applying the disclosure, when a compressed mode is started/stopped, a current compressed mode state is directly notified to all nodeBs coupled with a terminal, the problem that the execution state of the compressed mode of the terminal and a network side cannot be synchronized is solved, normal operation of the compressed mode of the terminal is guaranteed, and the service quality of the terminal and the performance of the system are improved.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

The disclosure will be described in details below with reference to the accompanying drawings and in combination with the embodiments. It should be noted that, if there is no conflict, the embodiments of the application and the characteristics in the embodiments can be combined with one another.

A communication system in the embodiments of the disclosure comprises an RNC, a node B (NodeB, also referred to as a serving node B) and a terminal. All devices are in wireless connection and follow related wireless communication standards. Description is made for the embodiments below which are implemented on the communication system, for example.

Embodiment 1

Figure 4:
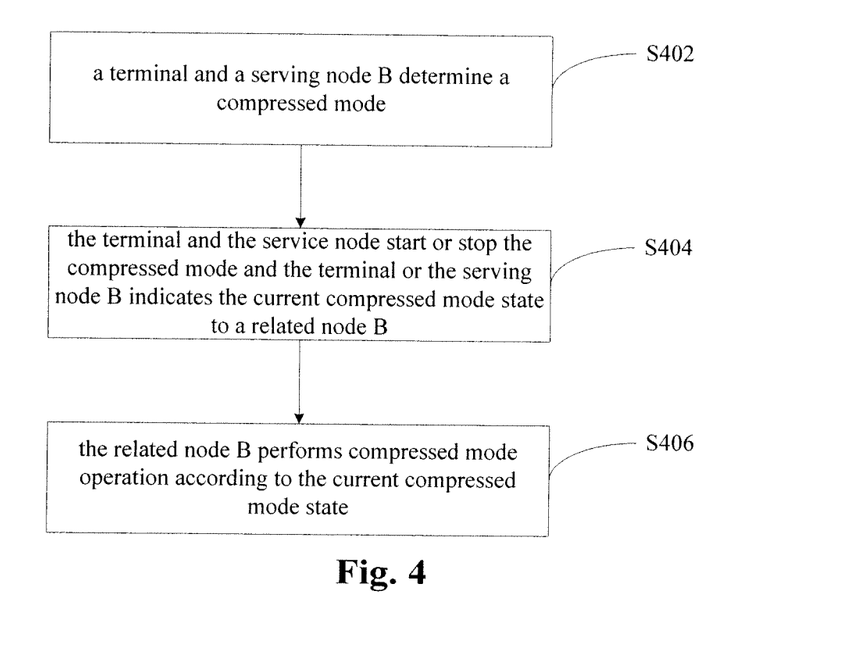
FIG. 4 is a flowchart illustrating a method for controlling a compressed mode in a macro-diversity state according to Embodiment 1 of the disclosure.

The embodiment provides a method for controlling a compressed mode in a macro-diversity state. A terminal in the method is in the macro-diversity state. As shown in FIG. 4, the method comprises the following steps:

Step S402: a terminal and a serving node B determine a compressed mode, wherein the compressed mode comprises: transmission gap pattern sequence information (e.g. a transmission gap pattern sequence identifier). The structure of the transmission gap pattern sequence can refer to the structure as shown in FIG. 1, which will not be repeated here.

Preferably, the compressed mode can further comprise: start time of the compressed mode (which can be a CFN) and/or repetition times of a transmission gap pattern of a transmission gap pattern sequence.

Preferably, the step of determining the compressed mode by the terminal and the serving node B comprises one of the followings: the terminal, the serving node B, and an RNC predetermine the compressed mode; the RNC configures the compressed mode for the terminal and the serving node B.

Step S404: the terminal and the serving node B start or stop the compressed mode, the terminal or the serving node B indicates a current compressed mode state to a related node B, wherein the related node B and the terminal are coupled by an established radio link.

By taking the networking structures as shown in FIG. 2 and FIG. 3 as examples, the serving node B in the embodiment can be taken as NodeB1 and the related node B can be taken as NodeB2.

After the compressed mode is started or stopped, the current compressed mode state can be notified to the related node B by the terminal directly, or the current compressed mode state can be notified to the related node B by the serving node B. For example, for the networking structure as shown in FIG. 2, NodeB1 can notify the current compressed mode state to RNC1 first, and the RNC1 can subsequently notify the current compressed mode state to NodeB2. For the networking structure as shown in FIG. 3, NodeB1 can notify the current compressed mode state to RNC1 first, the RNC1 can subsequently notify the current compressed mode state to RNC2, and then the RNC 2 can indicate the current compressed mode state to NodeB2.

Step S406: the related node B performs compressed mode operation according to the current compressed mode state.

If the operation performed by the terminal and the serving node B in Step S404 is to start the compressed mode, the current compressed mode state can comprise: indication information identifying that the compressed mode has been started and the transmission gap pattern sequence information. In this case, the related node B starts the compressed mode according to the transmission gap pattern sequence information.

If the operation performed by the terminal and the serving node B in Step S404 is to stop the compressed mode, the current compressed mode state can comprise: indication information identifying that the compressed mode has been stopped, or can comprise stop time of the compressed mode. In this case, the related node B stops the corresponding compressed mode according to the indication information identifying that the compressed mode has been stopped.

The method of the embodiment can also be extended into the case that multiple compressed modes are determined between the terminal and the serving node B. Such a case can be realized by pointing out, in the indication above, the compressed mode (e.g. providing an identification number indicating the compressed mode) on which the operation is performed, the specific process will not be repeated here.

In the embodiment, when a compressed mode is started/stopped, the current compressed mode state is directly notified to all nodeBs coupled with the terminal, thus the problem that the execution state of the compressed mode of the terminal and a network side cannot be synchronized is solved, normal operation of the compressed mode of the terminal is guaranteed, and the service quality of the terminal and the performance of the system are improved.

Embodiment 2

The embodiment provides a method for controlling a compressed mode in a macro-diversity state. Description is made for the method which is implemented on the networking structure as shown in FIG. 2 for example. Node B1 and node B2 are coupled with RNC1. A radio link is established between a terminal and node B1 and between the terminal and node B2 at the same time. The terminal is in the macro-diversity state. The terminal, node B1 and an RNC1 predetermine "transmission gap pattern sequence" information of the started compressed mode, wherein the "transmission gap pattern sequence" information specifically comprises:

a set of "transmission gap pattern sequence", with the application purpose of "FDD measurement", and the "transmission gap pattern sequence" is identified by identifier 1. The set of "transmission gap pattern sequence" 1 comprises two kinds of alternate "transmission gap patterns", i.e. "transmission gap pattern 1" and "transmission gap pattern 2". One transmission gap is provided by each kind of "transmission gap pattern" in one "transmission gap pattern length". It can further comprise: the set of "transmission gap pattern sequences" 1 is repeated for 20 times.

RNC1 notifies the "transmission gap pattern sequence" information of the started compressed mode to the terminal via a Radio Resource Control (RRC) protocol layer control signalling; and RNC1 notifies the "transmission gap pattern sequence" information of the started compressed mode to node B1 via a Node B Application Part (NBAP) protocol layer control signalling.

Figure 5:
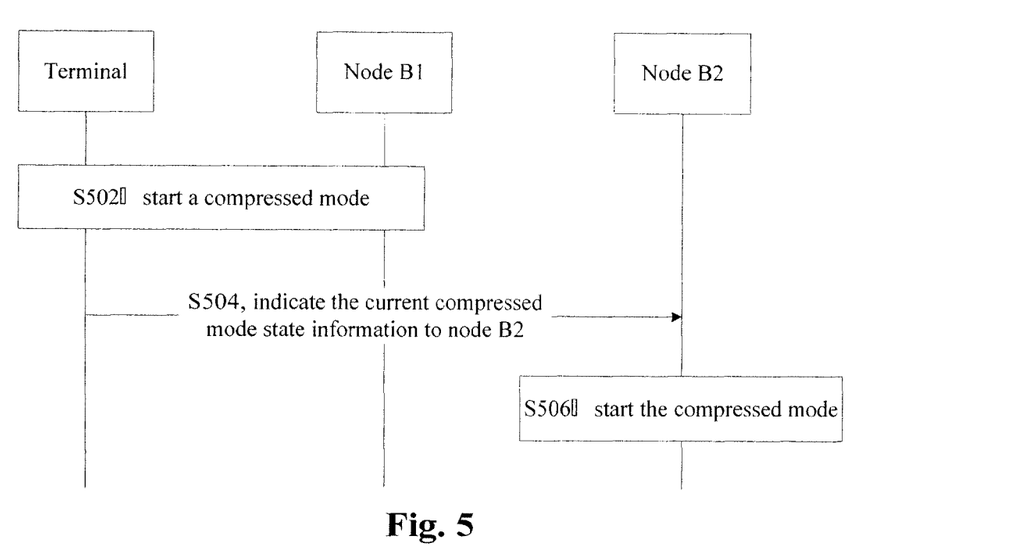
FIG. 5 is a flowchart illustrating a method for controlling a compressed mode in a macro-diversity state according to Embodiment 2 of the disclosure.

As shown in FIG. 5, the method comprises the following steps.

Step S502: a compressed mode is started between a terminal and node B1 (i.e. NodeB1).

Node B1 determines to start the compressed mode and node B1 sends a "High Speed-Shared Control Channel (HS-SCCH) order" via an HS-SCCH physical channel to notify the action of starting the compressed mode and a started "transmission gap pattern sequence" to the designated terminal 1.

In the method, the action of starting the compressed mode is expressed by a new HS-SCCH order type whose value is 2; the started "transmission gap pattern sequence" is identified by a "transmission gap pattern sequence identifier" 1. The identifier 1 is expressed by 3 bits during a coding process of the HS-SCCH order. Therefore, the "transmission gap pattern sequence identifier" 1 in the embodiment is expressed by that the value of these 3 bits of the specific HS-SCCH order (in which a specific HS-SCCH order is expressed by 3 bits under the type) is 1.

The above HS-SCCH order is a message, which is sent to the terminal, for controlling the compressed mode by the node B. The message has multiple types, and the type 2 of the message is used for controlling the compressed mode in the embodiment.

The specific information of the compressed mode in the embodiment is the "transmission gap pattern sequence". There can be multiple kinds of "transmission gap pattern sequences" for a terminal. Therefore, the "transmission gap pattern sequence" needs to be identified by an identifier, and the "transmission gap pattern sequence" is identified by "1" in the embodiment.

Step S504: the terminal detects that the terminal is coupled with multiple nodeBs currently, and notifies the current compressed mode state information to other nodeBs. The current compressed mode state information is notified to node B2 (i.e. NodeB2) in the embodiment.

The compressed mode state information notified by the terminal can carry an "activated state" as the current compressed mode state. The information can further carry a "transmission gap pattern sequence identifier" 1 of the currently started compressed mode, and can further carry the repetition times of the transmission gap pattern of the "transmission gap pattern sequence" of the currently started compressed mode as 20.

Step S506: after receiving the compressed mode state information notified by the terminal, the node B starts the compressed mode according to the content in the information, i.e. a transmission gap is reserved on a Fractional-Dedicated Physical Channel (F-DPCH).

After the terminal completes related measurement, the compressed mode will be stopped. At the moment, the terminal notifies node B1 and node B2 to stop the compressed mode.

For the networking structure as shown in FIG. 3, node B1 is on RNC1, and Node B2 is on RNC2. A radio link is established between the terminal and RNC1 and between the terminal and RNC2 at the same time. The terminal is in the macro-diversity state. The node B coupled with the terminal is coupled with different RNCs via an Iub interface. In this scenario, a message flow of controlling the compressed mode is the same as the method above, which will not be repeated here.

In the embodiment, when a compressed mode is started/stopped, the current compressed mode state is directly notified to all nodeBs coupled with the terminal, thus the problem that the execution state of the compressed mode of the terminal and a network side cannot be synchronized is solved, normal operation of the compressed mode of the terminal is guaranteed, and the service quality of the terminal and the performance of the system are improved.

Embodiment 3

Figure 6:
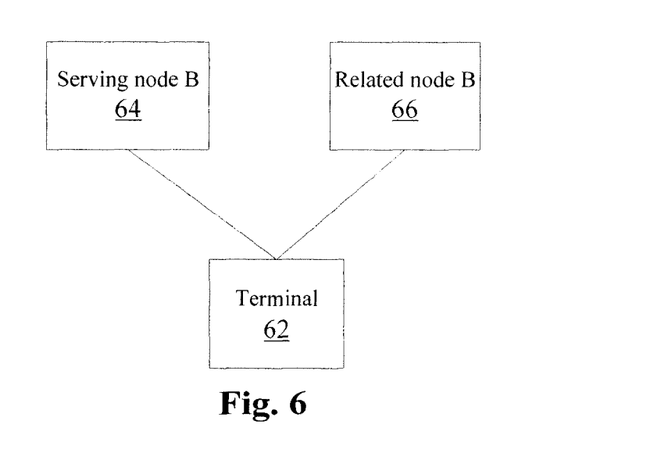
FIG. 6 is a structural diagram illustrating a system for controlling a compressed mode in a macro-diversity state according to Embodiment 3 of the disclosure.

The embodiment provides a system for controlling a compressed mode in a macro-diversity state. As shown in FIG. 6, the system comprises: a terminal 62, a serving node B 64 and a related node B 66, wherein the terminal is coupled with the serving node B 64 and the related node B 66 via a radio link, respectively.

The terminal 62 is configured to determine a compressed mode with the serving node B 64, and after starting or stopping the compressed mode, indicate a current compressed mode state to the related node B 66, wherein the compressed mode comprises: transmission gap pattern sequence information (e.g. a transmission gap pattern sequence identifier). The structure of the transmission gap pattern sequence can be referred to the structure as shown in FIG. 1, which will not be repeated here.

Preferably, the compressed mode can further comprise: start time of the compressed mode (which can be a CFN) and/or repetition times of a transmission gap pattern of a transmission gap pattern sequence.

The serving node B 64 is configured to determine the compressed mode with the terminal 62.

The related node B 66 is configured to perform compressed mode operation according to the current compressed mode state.

Figure 7:
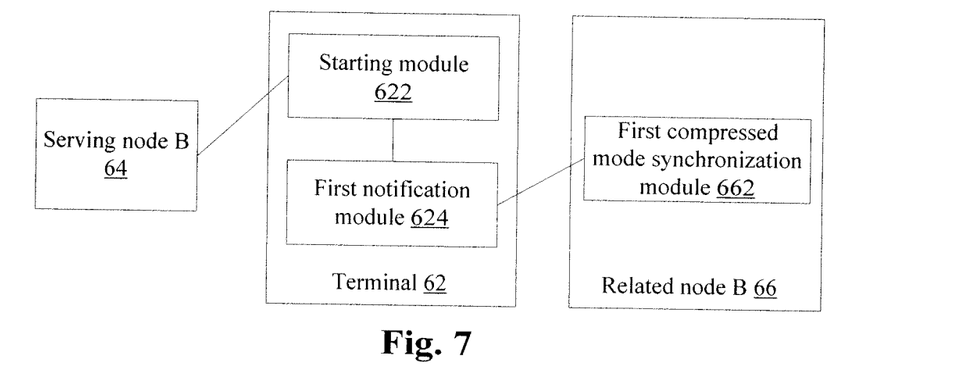
FIG. 7 is a specific structural diagram illustrating a system for controlling a compressed mode in a macro-diversity state according to Embodiment 3 of the disclosure.

As shown in FIG. 7, which is a specific structural diagram illustrating a system for controlling a compressed mode in a macro-diversity state according to the embodiment of the disclosure, the terminal 62 comprises:

a starting module 622, configured to start the compressed mode with the serving node B 64;

a first notification module 624, coupled with the starting module 622 and configured to indicate the current compressed mode state to the related node B 66, wherein the current compressed mode state comprises: indication information identifying that the compressed mode has been started and the transmission gap pattern sequence information above.

The related node B 66 comprises: a first compressed mode synchronization module 662, configured to start the compressed mode according to the transmission gap pattern sequence information.

Figure 8:
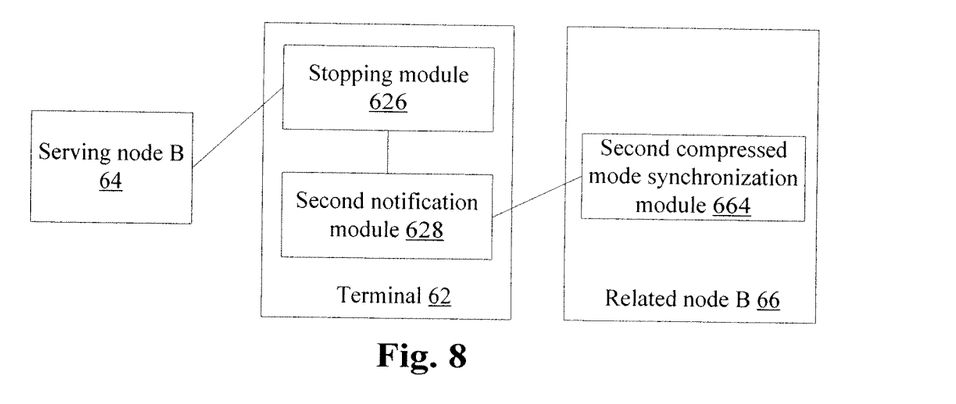
FIG. 8 is another specific structural diagram illustrating a system for controlling a compressed mode in a macro-diversity state according to Embodiment 3 of the disclosure.

As shown in FIG. 8, which is a specific structural diagram illustrating a system for controlling a compressed mode in a macro-diversity state according to the embodiment of the disclosure, the terminal 62 comprises:

a stopping module 626, configured to stop the compressed mode;

a second notification module 628, coupled with the stopping module 626 and configured to indicate the current compressed mode state to the related node B 66, wherein the current compressed mode state comprises: indication information identifying that the compressed mode has been stopped.

The related node B 66 comprises: a second compressed mode synchronization module 664, configured to stop the corresponding compressed mode according to the indication information identifying that the compressed mode has been stopped.

In the embodiment, the terminal 62 and the serving node B 64 can determine the compressed mode through a manner which comprises one of the followings: the terminal 62, the serving node B 64, and an RNC predetermine the compressed mode; the RNC configures the compressed mode for the terminal 62 and the serving node B 64.

In the embodiment, when a compressed mode is started/stopped, the current compressed mode state is directly notified to all nodeBs coupled with the terminal, thus the problem that the execution state of the compressed mode of the terminal and a network side cannot be synchronized is solved, normal operation of the compressed mode of the terminal is guaranteed, and the service quality of the terminal and the performance of the system are improved.

Embodiment 4

Figure 9:
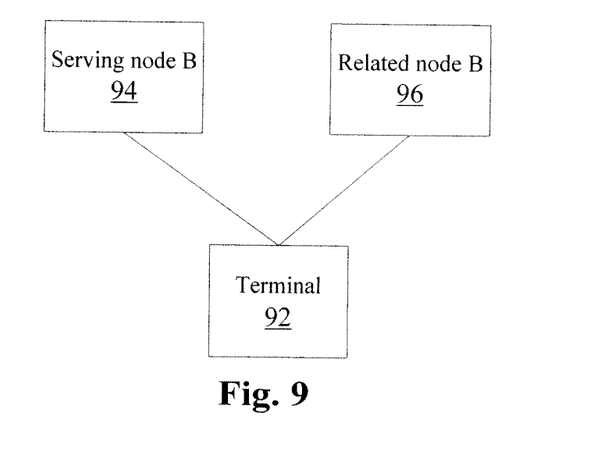
FIG. 9 is a structural diagram illustrating a system for controlling a compressed mode in a macro-diversity state according to Embodiment 4 of the disclosure.

The embodiment provides a system for controlling a compressed mode in a macro-diversity state. As shown in FIG. 9, the system comprises: a terminal 92, a serving node B 94 and a related node B96, wherein the terminal 92 is coupled with the serving node B 94 and the related node B 96 via a radio link, respectively.

The terminal 92 is configured to determine the compressed mode with the serving node B 94, and start or stop the compressed mode, wherein the compressed mode comprises: transmission gap pattern sequence information (e.g. a transmission gap pattern sequence identifier). The structure of a transmission gap pattern sequence can be referred to the structure as shown in FIG. 1, which will not be repeated here.

Preferably, the compressed mode can further comprise: start time of the compressed mode (which can be a CFN) and/or repetition times of a transmission gap pattern of a transmission gap pattern sequence.

The serving node B 94 is configured to determine the compressed mode with the terminal, and after starting or stopping the compressed mode, indicate the current compressed mode state to the related node B 96.

The related node B 96 is configured to perform compressed mode operation according to the current compressed mode state.

Figure 10:
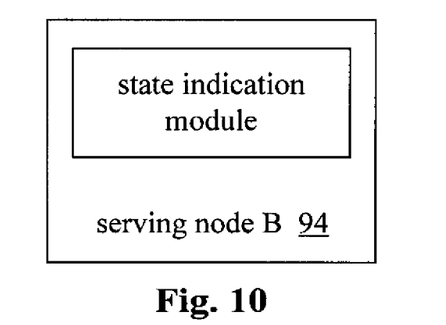
FIG. 10 is a structural diagram illustrating a serving node according to Embodiment 4 of the disclosure.

Preferably, the system above further comprises an RNC, and the serving node B 94 comprises: a state indication module, configured to notify the current compressed mode state to the RNC; the RNC is configured to indicate the current compressed mode state to the related node B 96.

In the embodiment, the terminal 92 and the serving node B 94 can determine the compressed mode through a manner which comprises one of the followings: the terminal 92, the serving node B 94, and the RNC predetermine the compressed mode; the RNC configures the compressed mode for the terminal 92 and the serving node B 94.

Figure 11:
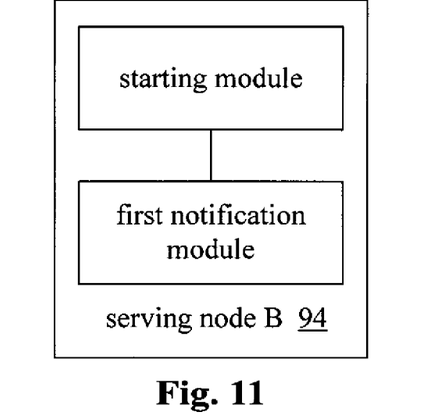
FIG. 11 is another structural diagram illustrating a serving node according to Embodiment 4 of the disclosure.

Preferably, the serving node B 94 comprises: a starting module, configured to start the compressed mode with the terminal 92; a first notification module, configured to indicate the current compressed mode state to the related node B 96, wherein the current compressed mode state comprises: indication information identifying that the compressed mode has been started and the transmission gap pattern sequence information above;

the related node B 96 comprises: a first compressed mode synchronization module configured to start the compressed mode according to the transmission gap pattern sequence information.

Figure 12:
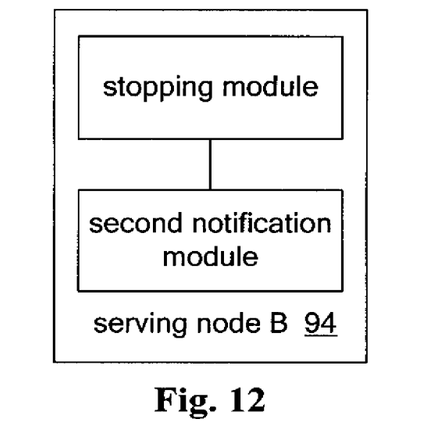
FIG. 12 is still another structural diagram illustrating a serving node according to Embodiment 4 of the disclosure.

Preferably, the serving node B 94 comprises: a stopping module, configured to stop the compressed mode; a second notification module, configured to indicate the current compressed mode state to the related node B 96, wherein the current compressed mode state comprises: indication information identifying that the compressed mode has been stopped;

the related node B 96 comprises: a second compressed mode synchronization module, configured to stop the corresponding compressed mode according to the indication information identifying that the compressed mode has been stopped.

In the embodiment, the terminal 62 and the serving node B 64 can determine the compressed mode through a manner which comprises one of the followings: the terminal 62, the serving node B 64, and the RNC predetermine the compressed mode; the RNC configures the compressed mode for the terminal 62 and the serving node B 64.

In the embodiment, when a compressed mode is started/stopped, the current compressed mode state is directly notified to all nodeBs coupled with a terminal, thus the problem that the execution state of the compressed mode of the terminal and a network side cannot be synchronized is solved, normal operation of the compressed mode of the terminal is guaranteed, and the service quality of the terminal and the performance of the system are improved.

In the embodiments above, when a compressed mode state changes, the current compressed mode state will be notified to all nodeBs coupled with a terminal, thus the problem that the execution state of the compressed mode of the terminal and a network side cannot be synchronized is solved, normal operation of the compressed mode of the terminal is guaranteed, and the service quality of the terminal and the performance of the system are improved.

INDUSTRIAL APPLICABILITY

The technical solution of the disclosure jointly considers the execution state synchronization requirement of a compressed mode between a terminal and a network side, and meets the execution state synchronization requirement of the compressed mode to the greatest extent. When a compressed mode state changes, the current compressed mode state is notified to all nodeBs coupled with the terminal, and the node B executes the compressed mode operation according to the current compressed mode state, thus normal operation of the compressed mode of the terminal is guaranteed, and the service quality of the terminal and the performance of the system are improved.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. A method for controlling a compressed mode in a macro-diversity state, said method comprising:
   a terminal and a serving node B determining a compressed mode, wherein the compressed mode comprises: transmission gap pattern sequence information;
   the terminal and the serving node B starting or stopping the compressed mode, the terminal or the serving node B, via a Radio Network Controller (RNC), indicating a current compressed mode state to a related node B so that the related node B performs compressed mode operation according to the current compressed mode state, wherein the related node B and the terminal are coupled by an established radio link.

2. The method according to claim 1, wherein the step of the terminal and the serving node B determining the compressed mode comprises one of the followings:
   the terminal, the serving node B, and the RNC predetermining the compressed mode;
   the RNC configuring the compressed mode for the terminal and the serving node B.

3. The method according to claim 2, wherein the compressed mode further comprises: start time of the compressed mode and/or repetition times of a transmission gap pattern of a transmission gap pattern sequence.

4. The method according to claim 2, wherein the compressed mode is stopped and the current compressed mode state comprises: indication information identifying that the compressed mode has been stopped;
the step of the related node B performing the compressed mode operation according to the current compressed mode state comprises:
the related node B stopping a corresponding compressed mode according to the indication information identifying that the compressed mode has been stopped.

5. The method according to claim 1, wherein the step of the serving node B indicating the current compressed mode state to the related node B comprises:
the serving node B notifying the current compressed mode state to an RNC, and the RNC indicating the current compressed mode state to the related node B.

6. The method according to claim 5, wherein the compressed mode further comprises: start time of the compressed mode and/or repetition times of a transmission gap pattern of a transmission gap pattern sequence.

7. The method according to claim 5, wherein the compressed mode is stopped and the current compressed mode state comprises: indication information identifying that the compressed mode has been stopped;
the step of the related node B performing the compressed mode operation according to the current compressed mode state comprises:
the related node B stopping a corresponding compressed mode according to the indication information identifying that the compressed mode has been stopped.

8. The method according to claim 1, wherein the compressed mode is started and the current compressed mode state comprises: indication information identifying that the compressed mode has been started and the transmission gap pattern sequence information;
the step of the related node B performing the compressed mode operation according to the current compressed mode state comprises:
the related node B starting the compressed mode according to the transmission gap pattern sequence information.

9. The method according to claim 8, wherein the compressed mode further comprises: start time of the compressed mode and/or repetition times of a transmission gap pattern of a transmission gap pattern sequence.

10. The method according to claim 8, wherein the compressed mode is stopped and the current compressed mode state comprises: indication information identifying that the compressed mode has been stopped;
the step of the related node B performing the compressed mode operation according to the current compressed mode state comprises:
the related node B stopping a corresponding compressed mode according to the indication information identifying that the compressed mode has been stopped.

11. The method according to claim 1, wherein the compressed mode further comprises: start time of the compressed mode and/or repetition times of a transmission gap pattern of a transmission gap pattern sequence.

12. The method according to claim 1, wherein the compressed mode is stopped and the current compressed mode state comprises: indication information identifying that the compressed mode has been stopped;
the step of the related node B performing the compressed mode operation according to the current compressed mode state comprises:
the related node B stopping a corresponding compressed mode according to the indication information identifying that the compressed mode has been stopped.

13. A terminal comprising memory storing a plurality of modules; a processor upon executing the plurality of modules performs the following:
determine a compressed mode with a serving node B, and after the compressed mode is started or stopped, indicate a current compressed mode state to a related node B, wherein the compressed mode comprises: transmission gap pattern sequence information.

14. The terminal according to claim 13, wherein processor is further configured to execute a starting module and a first notification module; wherein
the starting module, configured to start the compressed mode with the serving node B; and
the first notification module, configured to indicate the current compressed mode state to the related node B, wherein the current compressed mode state comprises: indication information identifying that the compressed mode has been started and the transmission gap pattern sequence information.

15. The terminal according to claim 13, wherein the processor is further configured to execute a stopping module and a second notification module;
wherein
the stopping module, configured to stop the compressed mode; and
the second notification module, configured to indicate the current compressed mode state to the related node B, wherein the current compressed mode state comprises: indication information identifying that the compressed mode has been stopped.

16. A serving node B comprising memory storing a plurality of modules; a processor upon executing the plurality of modules performs the following:
determine the compressed mode with a terminal, and after the compressed mode is started or stopped, indicate a current compressed mode state to a related node B, wherein the compressed mode comprises: transmission gap pattern sequence information.

17. The serving node B according to claim 16, wherein the processor is further configured to execute a state indication module:
the state indication module, configured to notify the current compressed mode state to a Radio Network Controller (RNC) which is configured to indicate the current compressed mode state to the related node B.

18. The serving node B according to claim 16, wherein the processor is further configured to execute a starting module:
wherein
the starting module, configured to start the compressed mode with the terminal;
the first notification module, configured to indicate the current compressed mode state to the related node B, wherein the current compressed mode state comprises: indication information identifying that the compressed mode has been started and the transmission gap pattern sequence information.

19. The serving node B according to claim 16, wherein the processor is further configured to execute a stopping module and a second notification module;
wherein
the stopping module, configured to stop the compressed mode;
the second notification module, configured to indicate the current compressed mode state to the related node B, wherein the current compressed mode state comprises:
indication information identifying that the compressed mode has been stopped.

\* \* \* \* \*